(12) United States Patent
Olsen (10) Patent No.: US 8,931,671 B2
(45) Date of Patent: Jan. 13, 2015

(54) BICYCLE CARRIER AND METHOD FOR SERIALLY LOADING BICYCLES THEREON

(75) Inventor: Christopher J. Olsen, Bayport, NY (US)

(73) Assignee: Up Right Designs LLC, Montvale, NJ (US)

( * ) Notice: Subject to any disclaimer, the term of this patent is extended or adjusted under 35 U.S.C. 154(b) by 387 days.

(21) Appl. No.: 13/190,638

(22) Filed: Jul. 26, 2011

(65) Prior Publication Data
US 2012/0027560 A1   Feb. 2, 2012

Related U.S. Application Data

(60) Provisional application No. 61/369,416, filed on Jul. 30, 2010.

(51) Int. Cl.
*B60R 9/10* (2006.01)

(52) U.S. Cl.
CPC ............... *B60R 9/10* (2013.01); *Y10S 224/924* (2013.01)
USPC .......................................... 224/519; 224/924

(58) Field of Classification Search
USPC ................ 224/519–523, 924; 211/17–22; D12/408
See application file for complete search history.

(56) References Cited

U.S. PATENT DOCUMENTS

| | | | | |
|---|---|---|---|---|
| 3,794,227 A | * | 2/1974 | Stearns | 224/532 |
| 5,067,641 A | | 11/1991 | Johnson et al. | |
| 5,082,120 A | * | 1/1992 | Vega | 211/20 |
| 5,330,084 A | | 7/1994 | Peters | |
| 5,690,260 A | * | 11/1997 | Aikins et al. | 224/505 |
| 5,702,040 A | * | 12/1997 | Hedeen | 224/511 |
| D393,621 S | * | 4/1998 | Gregory | D12/408 |
| 6,182,836 B1 | * | 2/2001 | Gutierrez | 211/22 |
| 6,889,880 B2 | * | 5/2005 | Albaisa et al. | 224/491 |
| 2006/0060623 A1 | * | 3/2006 | Huang | 224/504 |
| 2006/0237505 A1 | * | 10/2006 | Hammond | 224/521 |

OTHER PUBLICATIONS

International Search Report and Written Opinion for International Application No. PCT/US2011/045280 date of mailing Dec. 5, 2011.

* cited by examiner

*Primary Examiner* — Adam Waggenspack
(74) *Attorney, Agent, or Firm* — Mintz Levin Cohn Ferris Glovsky and Popeo, P.C.

(57) ABSTRACT

Bicycle carriers and corresponding methods for loading bicycles and/or other wheeled vehicles onto such carriers are provided. In one embodiment, a bicycle carrier includes a support member (e.g., vertical or generally vertical support member), a hitch member, an elongate upper member, and an elongate lower member. The elongate upper member has an elongate body and a free distal end configured for receipt, serially one after another, of a plurality of wheels of a corresponding plurality of bicycles. For each bicycle, adjacent spokes of a bicycle wheel are positioned about the free distal end of the elongate member and the bicycle is moved backward along the elongate body towards the support member. The elongate body is configured to support the weight of the bicycles via contact with the rims of the bicycle wheels. The carrier is configured such that the bicycles hang generally vertically from the elongate body.

17 Claims, 11 Drawing Sheets

BICYCLE CARRIER AND METHOD FOR SERIALLY LOADING BICYCLES THEREON

CROSS-REFERENCE TO RELATED APPLICATION

This application claims priority to U.S. provisional patent application No. 61/369,416, filed Jul. 30, 2010, which is hereby incorporated by reference herein in its entirety.

FIELD OF THE INVENTION

Embodiments of the present invention relate to devices configured to hold one or more bicycles and/or other wheeled vehicles (e.g., unicycles or tag-along bicycle trailers), for example, vertically by one rim per bicycle or vehicle. A device according to some embodiments of the present invention can be used to store bicycles or other wheeled vehicles (e.g., within a garage) or transport them, for example, via attachment of the device to the rear of an automobile.

BACKGROUND OF THE INVENTION

Bicycles come with a wide variety of frame styles and designs. When loading bicycles onto typical bicycle carriers, these frame designs can make mounting them onto the carrier difficult. This is because most rear automobile bicycle carriers mount the bicycles via their frames. Loading more than one bicycle onto a bicycle carrier can also be difficult with standard frame-mount carriers because they do not allow the bicycles to be oriented in a way that allows the components of each bicycle to clear each other and attain space saving placement. Current bicycle racks also typically have one or two horizontal arms that support and secure the bicycles via their frame. Finding a place for these arms is difficult on many newer types of bicycles that have wide profile frame tubing or unique frame shapes.

Bicycles also typically have cables and mechanisms for brakes and gears on the frames themselves, as well as water bottle holders, pumps, and/or other components. Mounting bicycles via the frames can damage these components.

Rear automobile bicycle carriers that hold bicycles via their tires and in an upright horizontal position can potentially take care of the frame loading problems, but do not allow for dense packaging of multiple bicycles. These types of carriers are also costly and occupy a significant amount of space behind the automobile.

In view of the foregoing, it would be desirable to provide improved bicycle carriers, for example, that can accommodate a variety of (e.g., all) types of bicycles and other wheeled vehicles (e.g., unicycles and tag-along bicycle trailers) and can do so while maximizing usage of space and storage or transport capability.

SUMMARY OF EMBODIMENTS OF THE INVENTION

Embodiments of the present invention are directed to carriers for bicycles and/or other wheeled vehicles.

According to one aspect of some embodiments of the present invention, a bicycle carrier is provided that includes a support member (e.g., vertical or generally vertical support member), a hitch member extending from the support member, an elongate upper member, and an elongate lower member. In some embodiments, the elongate upper member has an elongate body and a free distal end configured for receipt, serially one after another, of a plurality of wheels of a corresponding plurality of bicycles (e.g., up to five, six, or more bicycles). The carrier is configured such that, for each bicycle, adjacent spokes of a first bicycle wheel can be positioned about the free distal end of the elongate member and the bicycle can be moved backward along the elongate body towards the support member. The elongate body is configured to support the weight of the bicycles via contact with the rims of the bicycle wheels. The carrier is configured such that the rest of the bicycles hangs below the elongate body.

In some embodiments of the present invention, the elongate lower member is positioned generally below said elongate upper member, and is configured to contact and stabilize the bicycles hanging from the elongate body of the upper member.

In some embodiments of the present invention, the elongate upper member extends from the support member perpendicularly or non-perpendicularly (e.g., at an upward angle of about 5 degrees to about 30 degrees, or less than about 45 degrees). In some embodiments, the elongate upper member has a thickness that is less than its length and height along an entire span of the elongate upper member and free distal end (e.g., a thickness of less than or equal to about ½ inch and a height of less than or equal to about 4 inches), for example, giving the elongate upper member a blade-like shape.

In some embodiments of the present invention, the elongate lower member extends generally perpendicularly or at an upward angle from the support member. In some embodiments, the hitch member extends from the support member in a first direction (e.g., towards the rear of an automobile) and the elongate upper and lower members extend from the support member in a direction opposite to the first direction (e.g., away from the rear of the automobile). In some embodiments, the elongate lower member is directly below and has no lateral offset relative to the elongate upper member. The elongate lower member may be attachable to, and detachable from (e.g., via a threaded connection), the support member, which may be configured with a plurality of locations for receipt of the elongate lower member (e.g., from approximately 12 inches above the hitch member to approximately 36 inches above the hitch member with, for example, about 1, 2, 3, or 4-inch spacing per location).

In some embodiments of the present invention, at least one of the body of the elongate upper member and the elongate lower member comprises at least one spacer (e.g., four spacers per upper and lower member). Such spacer(s) may be configured to separate the bicycles from one another (e.g., via their tires or rims) when loaded onto the carrier.

In some embodiments of the present invention, at least one of the body of the elongate upper member, the lower elongate member, support member, and hitch member comprises a soft durometer material attached or formed integrally thereto (e.g., on a surface) to prevent damage to the bicycles loaded onto the carrier. For example, the soft durometer material may include rubber, silicon, urethane, and/or foam.

In some embodiments of the present invention, the bicycle carrier may include a strap, cord, or a bar, for example, configured to extend from the free distal end of the elongate upper member to the support member to further secure the bicycles to the bicycle carrier. In some embodiments, the support member may include a hinged connection along its length to allow the support member to be collapsed when not in use.

According to another aspect of some embodiments of the present invention, a method for serially loading, one after another, bicycles or other wheeled vehicles onto a carrier is provided. A wheel of a first vehicle is positioned about a free distal end of an elongate member. The first vehicle is moved (e.g., slid and/or lifted) backward along an elongate body of the elongate member towards a support member attached to the elongate member (e.g., causing the first vehicle to contact the support member or a spacer element). This causes a rim of the wheel to contact the elongate body and a remainder of the first vehicle to hang below the elongate body. Subsequently, a wheel of a second vehicle is positioned about the free distal end of the elongate member. The second vehicle is moved backward along the elongate body of the elongate member towards the first vehicle (e.g., causing the second vehicle to contact the first vehicle or a spacer element). This causes a rim of the wheel of the second vehicle to contact the elongate body and a remainder of the second vehicle to hang below the elongate body. In some embodiments, the method further includes securing a strap, cord, or bar from, for example, the free distal end of the elongate upper member to the support member to further secure the vehicles to the carrier.

According to yet another aspect of some embodiments of the present invention, a bicycle carrier is provided that includes a central support member, a hitch member extending from the central support member, a first side support member connected to the central support member and being laterally offset from the central support member to a first side, and a second side support member connected to the central support member and being laterally offset from the central support member to a second side opposite the first side. The bicycle carrier also includes first and second elongate members extending from the first side support member and the second side support member, respectively. In some embodiments, each of the elongate members has an elongate body and a free distal end. In some embodiments, the first elongate member is configured for receipt of the first wheels of a plurality of bicycles and the second elongate member is configured for receipt of the second wheels of the plurality of bicycles.

In some embodiments of the present invention, the bicycle carrier is configured such that the hitch member is generally perpendicular to the central support member. In some embodiments, the first side support member is generally parallel to the central support member. In some embodiments, the second side support member is generally parallel to the central support member. In some embodiments, the elongate members are positioned at generally the same heights along the first and second side support members such that the bicycles are received generally horizontally by the bicycle carrier.

According to another aspect according to some embodiments of the present invention, a bicycle carrier is provided that includes a central support member, a hitch member extending from the central support member, a first side support member connected to the central support member and being laterally offset from the central support member to a first side, and a second side support member connected to the central support member and being laterally offset from the central support member to a second side opposite the first side. The bicycle carrier also includes first, second, and third elongate members extending from the central support member, the first side support member, and the second side support member, respectively. In some embodiments, each of the elongate members has an elongate body and a free distal end. In some embodiments, the first elongate member is configured to cause the vehicle(s) received thereby to hang generally vertically below the first elongate member. In some embodiments, the second and third elongate members are configured to cause the vehicle(s) received cooperatively thereby to hang generally horizontally.

In some embodiments of the present invention, the bicycle carrier further comprises an elongate lower member extending from the central support member and positioned generally below (e.g., directly below) the first elongate member. The elongate lower member may be configured to contact and stabilize the vehicle(s) hanging from the body of the first elongate member.

BRIEF DESCRIPTION OF THE DRAWINGS

For a better understanding of embodiments of the present invention, reference is made to the following description, taken in conjunction with the accompanying drawings, in which like reference characters refer to like parts throughout, and in which.

DETAILED DESCRIPTION OF THE PREFERRED EMBODIMENTS

Embodiments of the present invention relate to devices that are configured to hold one or more bicycles and/or other wheeled vehicles, for example, vertically by one rim per bicycle or vehicle. A device according to some embodiments of the present invention can be used to store bicycles and/or other wheeled vehicles (e.g., within a garage) or transport them, for example, via attachment of the device to an automobile. When used for storage, an adapter that mimics an automobile hitch receiver may be provided for rigid mounting on a wall or other surface and the device could be inserted or otherwise attached to this mount. This provides a place to not only mount and store the device, but also to conveniently store the bicycles and/or other wheeled vehicles as well.

Figure 1:
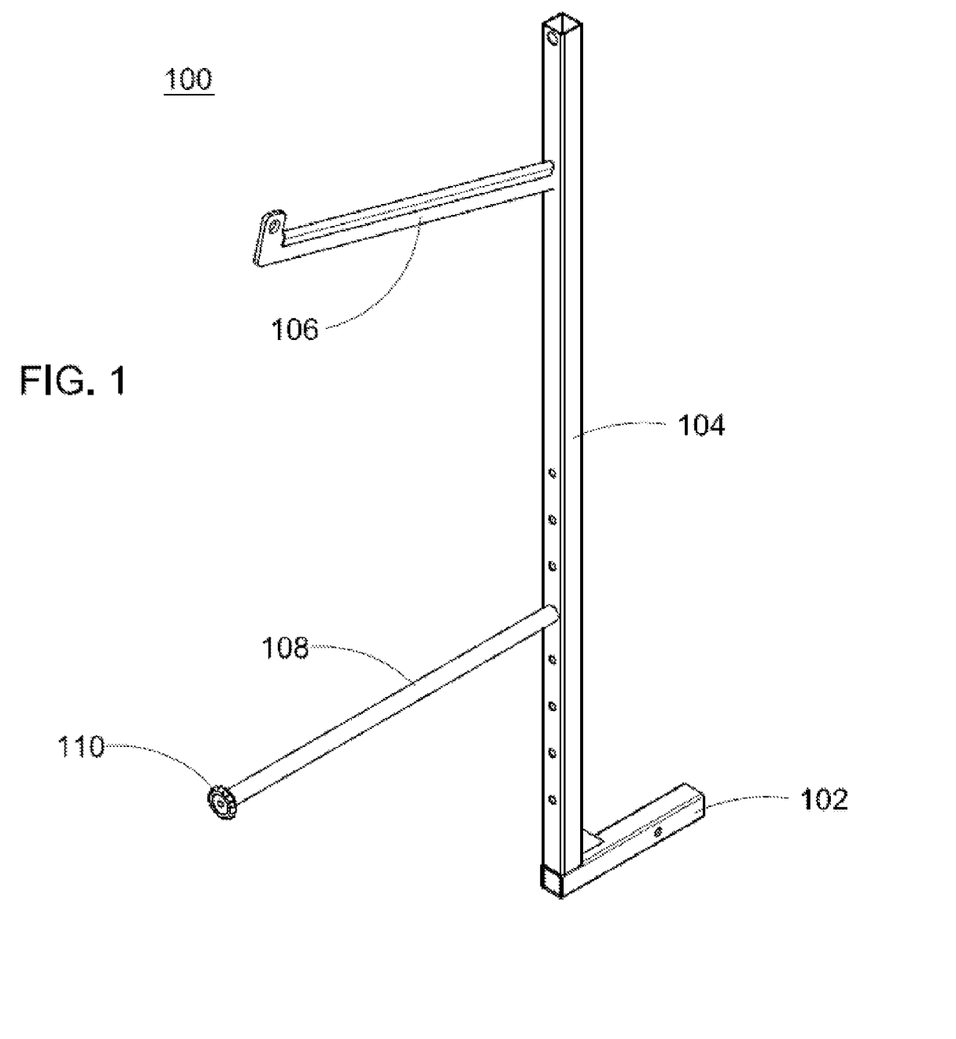
FIG. 1 is a schematic diagram of a bicycle carrier for carrying bicycles and/or other wheeled vehicles according to some embodiments of the present invention.

FIG. 1 shows a bicycle carrier 100 according to some embodiments of the present invention. Bicycle carrier 100 includes member (e.g., tube) 102 for attachment to, for example, the hitch of an automobile or other member (e.g., in a garage) via matable attachment. Bicycle carrier 100 also includes vertical or generally vertical support member 104, upper member 106, and lower member 108. As described in greater detail below, in some embodiments upper member 106 is configured in size for positioning between the spokes of a bicycle wheel and/or other wheeled vehicle. In some embodiments, upper member 106 has a generally blade-like shape, for example, being relatively flat and elongated such that its thickness is less than its length and height. Generally, the length of member 106 is the distance it extends outwardly from vertical member 104; its height is the distance it extends up and down in the vertical or almost vertical direction (depending on whether member 106 is perpendicular, or angled, relative to a vertical or generally vertical member 104); and its thickness is its span in the horizontal direction generally perpendicular to the direction of hitch member 102.

Figure 2:
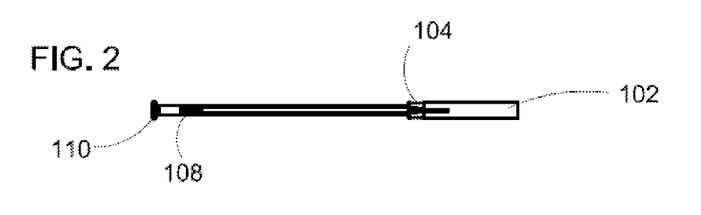
FIG. 2 is a top-down view of the bicycle carrier of FIG. 1.
Figures 3, 4:
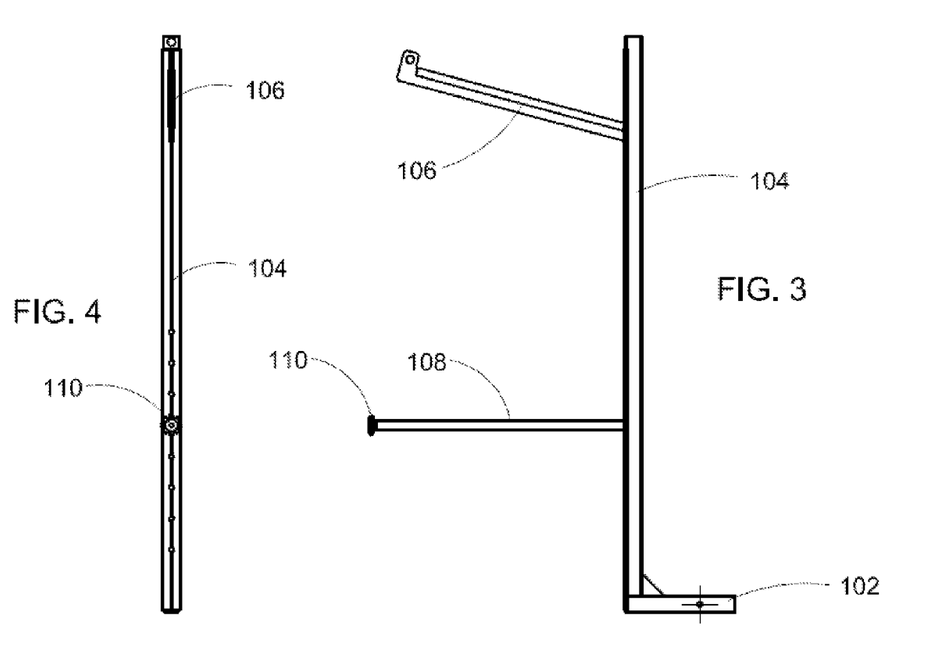
FIG. 3 is a side view of the bicycle carrier of FIG. 1.
FIG. 4 is a front view of the bicycle carrier of FIG. 1.

FIG. 2 is a top-down view, FIG. 3 is a side view, and FIG. 4 is a front view of bicycle carrier 100 according to some embodiments of the present invention. In FIG. 2, the length and thickness of upper member 106 is shown. In FIG. 3, the length and height of member 106 is shown. In FIG. 4, the height and thickness of upper member 106 is shown. With upper member 106 configured as shown, one or more bicycles and/or other wheeled vehicles can be loaded serially onto bicycle carrier 100 by positioning adjacent spokes of each bicycle or other vehicle wheel about upper member 106 and sliding the bicycle or other wheeled vehicle backward along the length of member 106.

According to some embodiments of the present invention, upper member 106 has a free distal end and an elongate body. In some embodiments, when bicycle carrier 100 is fully assembled, upper member 106 has a length of about 30 inches that extends from the front face of vertical member 104 to the free distal end. In other embodiments, upper member 106 could be longer or shorter. In some embodiments, upper member 106 has a thickness of less than or equal to about ½ inch and/or a height of less than or equal to about 4 inches (e.g., about 2 inches). In some embodiments, the thickness and/or height of member 106 may vary along its length but may adhere to these maximum thickness and/or height dimensions along the entire span of its length. For example, the distal end of member 106 may have a height of about 4 inches (e.g., acting as a stop to prevent vehicles from shifting off the end of member 106 during travel), whereas the remainder of member 106 has a height of about 2 inches. This is because, for example, adjacent wheel spokes of bicycles and/or other wheeled vehicles can have various spacings but typically such spokes are not closer than ½ inch apart. In addition, typically the height of the space between adjacent wheel spokes is not less than 4 inches (e.g., for a wheel having approximately 8-inch diameter rims). Thus, with upper member 106 configured according to these height and thickness values, all or virtually all bicycles and/or other wheeled vehicles can be serially mounted on carrier 100 by positioning adjacent spokes of each vehicle wheel about upper member 106 and sliding the vehicle backward along the length of member 106. In accordance with various embodiments of the present invention, the height and/or thickness of upper member 106 can be greater than, or less than, the values indicated above in order to accommodate other spacings between wheel spokes (e.g., non-standard wheel sizes). In some embodiments of the present invention, upper member 106 does not include any elements (e.g., projections, forked crown(s), etc.) other than the elements expressly shown in FIG. 1. In some embodiments of the present invention, the bicycle carriers and methods of their use illustrated in FIGS. 1-15 do not include any other elements other than the elements expressly shown in FIGS. 1-15.

In some embodiments of the present invention, hitch member 102 is approximately 12 inches long and made from 2×2 tubing (e.g., steel tubing). In some embodiments, vertical member 104 is approximately 70 inches long and made from 2×2 tubing. Generally, the length of vertical member 104 is selected such that member 106 holds the bicycles or other wheeled vehicles up sufficiently off the ground for storage or transport. In some embodiments, lower member 108 is a cylindrical member having a 1-inch diameter and a length of approximately 30 inches. Member 108 may have threads configured for threaded receipt within one or more locations within vertical member 104. For example, such locations may be situated in vertical member 104 from approximately 12 inches above the hitch member to approximately 36 inches above the hitch member with, for example, about 1, 2, 3, or 4-inch spacing per location. This may allow an end user to position lower member 108, for example, at an optimal location depending on the length(s) of the bicycle(s) and/or other wheeled vehicle(s) being stored or transported. In other embodiments, other sizes and/or configurations (e.g., square, cylindrical, or other profile shape tubing or solid construction) may be used for members 102, 104, and/or 108.

In some embodiments of the present invention, lower member 108 may adhere to the same or similar thickness and/or height values along its length as upper member 106 (e.g., a thickness of less than or equal to about ½ inch and/or a height of less than or equal to about 4 inches), or may even have more stringent requirements at least in terms of height. This may allow lower member 108 to be positioned through adjacent spokes of a first wheel (e.g., rear wheel) belonging to a bicycle that is hanging vertically from upper member 106 by a second wheel (e.g., front wheel). When multiple bicycles are hanging by their wheels from upper member 106, lower member 108 may be fed or "skewered" through the other, free-hanging wheels of the bicycles for attachment to member 104 (e.g., via a threaded connection). In some embodiments, lower member 108 may include a distal end 110 that is either rigidly fixed (e.g., one-piece construction) to member 108 or detachable (e.g., via a threaded connection) from the body of member 108. Distal end 110 may be wider than standard-sized adjacent spokes (e.g., generally circular having a diameter of greater than or equal to about 2 inches) to prevent the bottom wheels from pulling out past distal end 110. In some embodiments, a distal end of lower member 108 may include a reflector attached thereto to provide a measure of safety and visibility at night. Alternatively or additionally, reflector(s) could be attached to hitch member 102, support member 104, upper member 106, and/or at other location(s) of lower member 108.

In some embodiments, member 102 is configured for insertion into a standard hitch receiver of an automobile, similar in fashion to how a hitch ball for a trailer is installed for towing. In other embodiments, hitch member 102 or other attachment member is attached to the automobile or in another location by other means, such as, for example, using straps, mounting frames, bolts, other fasteners, or a combination of fasteners.

In the embodiment shown in FIG. 1, hitch member 102 is a strong member that is designed to fit tightly into a standard size automobile hitch receiver. Hitch member 102 may be formed from or comprise any hard, strong material, including, for example, steel, aluminum, alloys, composite material(s), and/or any other suitable material or combination of materials. In some embodiments, a hitch pin is used to securely attach hitch member 102 to a standard size automobile hitch receiver, by passing through holes that line up in the body of the receiver and hitch member 102, creating a deadbolt.

In some embodiments, vertical member 104 is securely attached to hitch member 102, making approximately a 90-degree angle upward from a horizontal plane. Other angular orientations can be utilized in other embodiments (e.g., 85-degree angle or 95-degree angle). In some embodiments, vertical member 104 may be permanently fixed to hitch member 102 by way of, for example, welding or one-piece construction. In other embodiments, vertical member 104 and hitch member 102 may be releasably engageable, capable of assuming both a connected configuration and a disconnected configuration via a suitable connection. In the embodiment shown in FIG. 1, vertical member 104 is a strong and rigid member, being designed to withstand the torque created by the weight of the bicycles and/or other wheeled vehicles and the dynamic forces from the weight of these vehicles incurred when traveling. Vertical member 104 may be formed from or comprise any hard, strong material, including, for example, steel, aluminum, alloys, composite material(s), and/or any other suitable material, or combination of materials.

Upper member 106 is securely attached to an upper portion of vertical member 104 by way of, for example, welding or one-piece construction. In some embodiments, upper member 106 is substantially or approximately horizontal (parallel) to the ground. In other embodiments, upper member 106 has an upward angle, such as, for example, approximately 5-30 degrees (e.g., approximately 15 degrees), or less than about 45 degrees, relative to a horizontal plane as it points away from the rear of the automobile and vertical member 104. Advantageously, this causes the bicycles and/or other wheeled vehicles to settle and remain towards the carrier and the automobile, which assists in loading. In addition, it causes the vehicles to be offset from each other vertically allowing, for example, the handlebars and other components to overlap and miss each other, which allows for very tight "nesting" of the vehicles.

In some embodiments, upper member 106 is thin, strong and rigid, and configured to support one or more bicycles via their wheel rims, one rim per each bicycle being carried. Accordingly, upper member 106 is configured to fit between the spokes in the bicycle wheels. Upper member 106 may be formed from or comprise any hard, strong material, including but not limited to steel, aluminum, alloys, composite material(s), and/or any other suitable material, or combination of materials. In some embodiments, one or more surfaces, or the entire surface, of upper member 106 has a soft durometer material attached or formed integrally to it so as not to mar or damage the bicycles or other vehicles mounted thereon. This surface may comprise any soft, compliant material, including, for example, rubber, silicon, urethane, foam, or any other suitable material or combination of materials. In some embodiments, this material can be attached using any suitable attachment method such as, for example, glue, epoxy, snap-on, screws, rivets, a material deposition or coating process, and/or hook and loop fastening.

In some embodiments, upper member 106 may include straps or a pivoting locking bar to lock and secure the wheels that are held by member 106. For example, in FIG. 1, upper member 106 includes a distal end that includes an opening.

Vertical member 104 also includes an opening on its top end. A strap or cord (e.g., rubber strap or bungee cord) may be attached to the distal opening of member 106 on one end, and on the other end to the opening in the top of vertical member 104. In another embodiment, a strap or cord may be fastened on both ends to the distal opening in upper member 106, with the length of the strap or cord extending around the bicycles or other wheeled vehicles loaded onto carrier 100. In still another embodiment, a strap or cord may be wrapped around the body of vertical member 104 (e.g., at approximately its midpoint between members 106 and 108) and the bicycles or other vehicles loaded onto carrier 100 to secure these vehicles to carrier 100.

In some embodiments, straps, cords, and/or other fastening mechanisms are provided in any or all locations on carrier 100 (e.g., along lower member 108 and/or vertical member 104) to secure bicycles to carrier 100.

Lower member 108 may be formed from or comprise any hard, strong material, including but not limited to steel, aluminum, alloys, composite material(s), and/or any other suitable material, or combination of materials. In some embodiments, lower member 108 may have an elongated, cylindrical shape. In some embodiments, lower member 108 may screw into or otherwise attach to one or more locations of vertical member 104.

Other elements that may be provided according to some embodiments of the present invention are as follows. In some embodiments, a pivot mechanism may be provided between hitch member 102 and vertical member 104 that allows the body of carrier 100 to be lowered out of the way for access to the tailgate of an automobile when carrier 100 has no bicycles on it. In some embodiments, a pivot may be provided between upper member 106 and vertical member 104 that allows upper member 106 to pivot (e.g., pivot down, up, or to the side) when not in use to prevent a person from accidentally walking into the extended member. Alternatively or additionally, in some embodiments, a pivot may be provided between lower member 108 and vertical member 104 that allows lower member 108 to pivot (e.g., pivot down, up, or to the side) when not in use to prevent a person from accidentally walking into the extended member.

In some embodiments, vertical member 104 may be attached to the end of hitch member 102. Any connections described in this application may include any suitable connector or connection mechanism, including, for example, one or more screws, bolts, adhesives, welds, uniform or one-piece construction or molding, etc., or combination thereof.

Upper member 106 is attached to an upper section of vertical member 104, and on the opposite side of vertical member 104 as hitch member 102. In some embodiments, the location at which upper member 106 is connected to vertical member 104 is fixed, or may be adjustable vertically along vertical member 104 via, for example, multiple tapped holes, slotted connections, other attachment mechanism, or combination of attachment mechanisms. An adjustable connection would allow upper member 106 to be positioned in an optimal position, for example, for maximum stability depending on the types of bicycles or other wheeled vehicles that are loaded onto carrier 100.

In various embodiments, lower member 108 attaches along a mid to lower section of vertical member 104. In some embodiments, lower member 108 is connected at an angle of 90 degrees to vertical member 104, and may be parallel to the ground. In other embodiments, lower member 108 is connected at a slight upward angle of approximately 5-30 degrees (e.g., approximately 15 degrees) relative to a horizontal plane that is perpendicular to vertical member 104. In the embodiment shown in FIG. 1, lower member 108 is mounted on the same side as upper member 106, directly below upper member 106 (no lateral offset), and is the same or approximately the same dimensional length (e.g., 30 inches long).

In some embodiments, the location at which lower member 108 is connected to vertical member 104 is fixed, or may be adjustable vertically along vertical member 104 via, for example, multiple tapped holes, slotted connections, other attachment mechanism, or combination of attachment mechanisms. An adjustable connection would allow lower member 108 to be positioned in an optimal position, for example, for maximum stability depending on the types of bicycles or other wheeled vehicles that are loaded onto carrier 100. In some embodiments, one or more surfaces or the entire surface of lower member 108 has a soft durometer material attached or formed integrally to it so as not to mar or damage the bicycles or other vehicles mounted thereon. This surface may comprise any soft, compliant material, including, for example, rubber, silicon, urethane, foam, or any other suitable material or combination of materials. In some embodiments, this material can be attached using any suitable attachment method such as, for example, glue, epoxy, snap-on, screws, rivets, a material deposition or coating process, and/or hook and loop fastening. Alternatively or additionally, in some embodiments hitch member 102 and/or vertical member 104 may include a soft durometer material attached or formed integrally thereto.

In various embodiments according to the present invention, carrier 100 may be provided as a unitary piece or in multiple pieces, for example, requiring some assembly and/or adjustment by a manufacturer and/or an end user. For example, one could first provide the elements, including hitch member 102, vertical member 104, upper member 106, and lower member 108, as one-piece construction elements or individual pieces that form these elements. Then those elements could be connected using, screws, welds, and/or adhesives (e.g., at least in part by a manufacturer and/or at least in part by an end user) to produce bicycle carrier 100 as shown in FIGS. 1-4.

Figure 5:
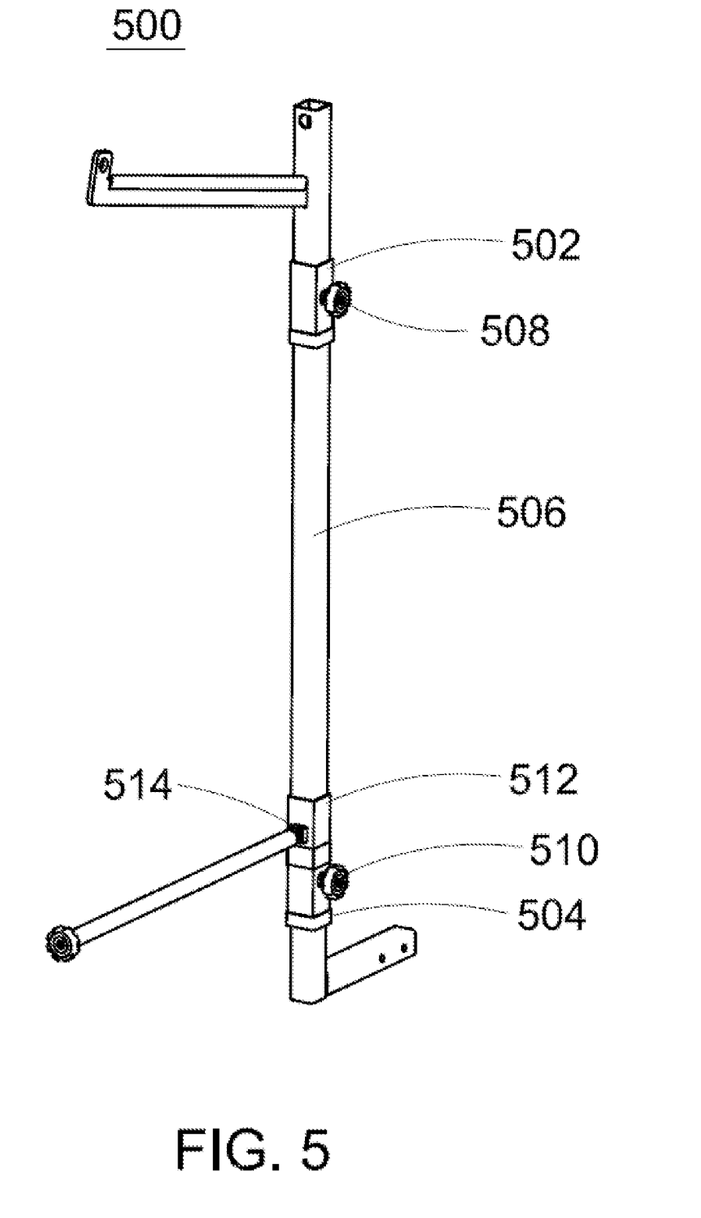
FIG. 5 is a schematic diagram of a bicycle carrier configured for connection to and disconnection of a middle part of a vertical member from a hitch member and an upper member according to some embodiments of the present invention.

FIG. 5 is a schematic diagram of a bicycle carrier 500 having connections for connecting and disconnecting a middle part of a vertical member from a hitch member and an upper member according to some embodiments of the present invention. As shown, bicycle carrier 500 has generally the same or similar form and function as bicycle carrier 100 (FIG. 1) when carrier 500 is assembled, including with respect to the inclusion of a hitch member (e.g., same or similar to hitch member 102), vertical or generally vertical member (e.g., same or similar to member 104), horizontal or upward angled upper member (e.g., same or similar to member 106), and horizontal or upward angled lower member (e.g., same or similar to member 108).

In addition, carrier 500 includes connection 502 allowing for connection and disconnection of the upper member (and an upper part of the vertical member) from the rest of carrier 500. Carrier 500 also includes connection 504 allowing for connection and disconnection of the hitch member (and a lower part of the vertical member) from the rest of carrier 500. Connection 502 may be a rigid sheath, welded or otherwise attached to the top part of the vertical member, that allows for connection and disconnection of the top part of the vertical member from a middle part 506 of the vertical member via a locking pin 508 and a corresponding hole in the middle part of the vertical member. Similarly, connection 504 may be a rigid sheath, welded or otherwise attached to a bottom section of middle part 506 of the vertical member, that allows for connection and disconnection of middle part 506 from a bottom part of the vertical member and the hitch member via a locking pin 510 and a corresponding hole in the bottom part of the vertical member. In carrier 500, the lower member also attaches to middle part 506 of vertical member using connection 512. Connection 512 may be a rigid sheath, configured for attachment at one or more locations along middle part 506 of the vertical member. In one embodiment, connection 512 may have a threaded feature 514 (e.g., female nut) attached (e.g., welded) or formed integrally thereto. A threaded feature (e.g., male bolt or screw) in the lower member may screw into and pass through threaded feature 514 of connection 512 and contact middle part 506 of the vertical member, creating a friction fit and allowing connection 512 and the lower member to be adjusted along any position of middle part 506 (e.g., from about 12 inches above the hitch member to about 36 inches above the hitch member). In another embodiment, connection 512 may attach to middle part 506 via projection(s) in an interior portion of connection 512 and corresponding hole(s) in middle part 506. Again, the lower member may screw into a threaded base 514 that is welded or otherwise attached to connection 512.

Figure 6:
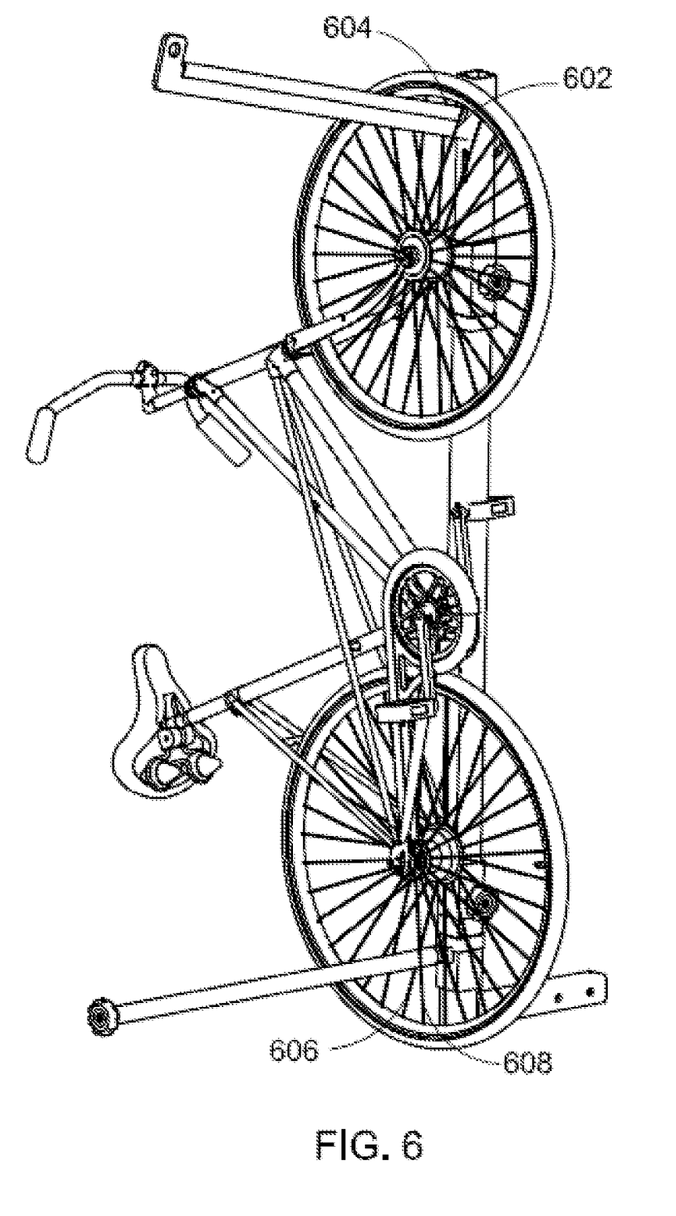
FIG. 6 is a perspective view of the bicycle carrier of FIG. 5 having a bicycle loaded thereon, wherein upper and lower members are positioned through spokes in the bicycle wheels.

FIG. 6 is a perspective view of the bicycle carrier of FIG. 5 having a bicycle loaded thereon, wherein the upper and lower members are positioned through adjacent spokes in the bicycle wheels. Specifically, the upper member is positioned through adjacent spokes 602 and 604 in the top wheel, and the rim of the wheel is resting on the upper member. The lower member is positioned through adjacent spokes 606 and 608 in the bottom wheel. In some embodiments, bicycle carrier 100 (FIG. 1) being similarly configured may be utilized in a similar manner.

Figure 7:
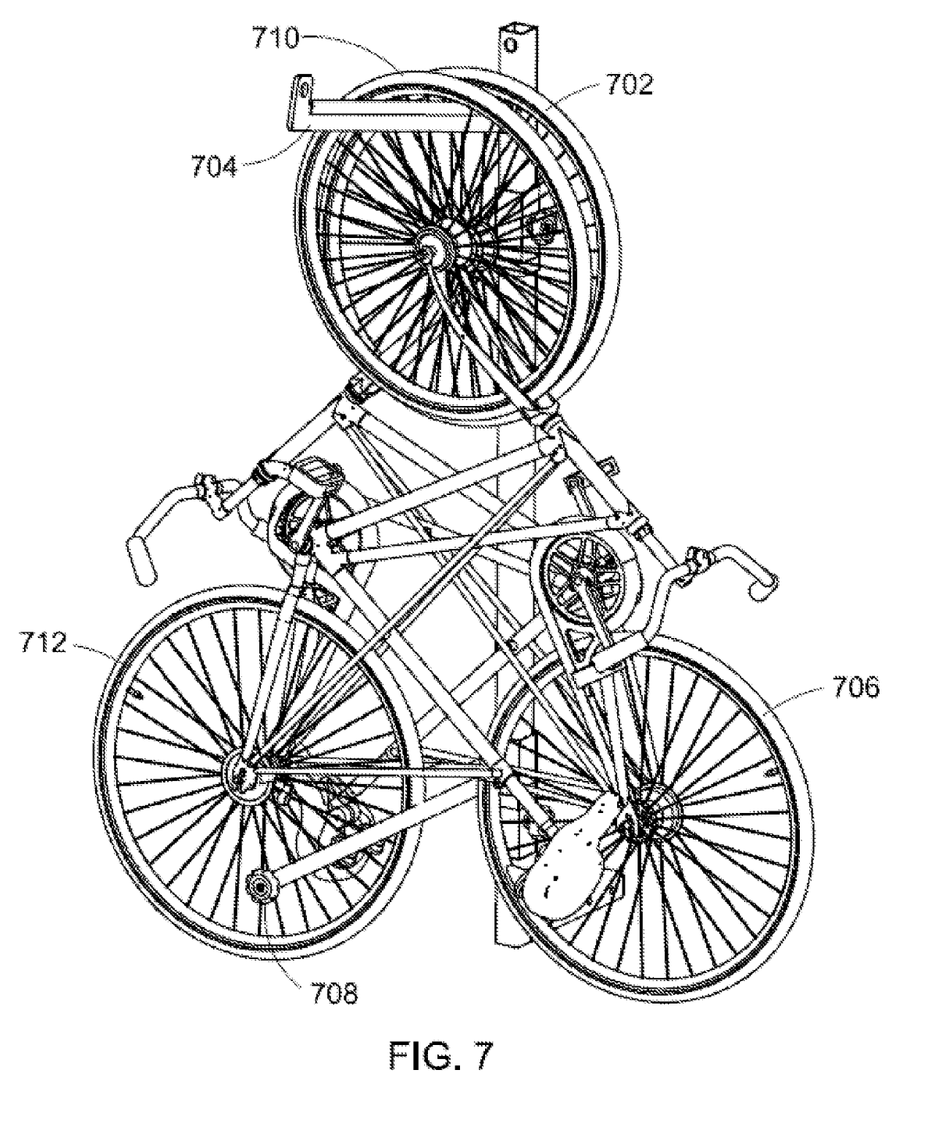
FIG. 7 is a perspective view of the bicycle carrier of FIG. 5 having two bicycles loaded thereon in a serial, alternating fashion.

FIG. 7 is a perspective view of the bicycle carrier of FIG. 5 having two bicycles loaded thereon in a serial, alternating fashion. As shown, a first bicycle 702 is loaded on the carrier by positioning adjacent spokes of a top wheel about upper member 704 and sliding bicycle 702 backwards along the length of upper member 704. The rim of bicycle 702 rests on upper member 704. As shown, the second wheel 706 of bicycle 702 is positioned towards the right of and abutting lower member 708. Second bicycle 710 is loaded on the carrier by positioning adjacent spokes of a top wheel about upper member 704 and sliding bicycle 710 backwards along the length of upper member 704 until it abuts first bicycle 702. The rim of bicycle 710 also rests on upper member 704. As shown, the second wheel 712 of bicycle 710 is positioned towards the left of and abutting lower member 708, which is the opposite orientation relative to first bicycle 702. The bicycle carrier can also carry other wheeled vehicles such as, for example, unicycles and/or tag-along bicycle trailers. Such wheeled vehicles can be mounted to the carrier in a similar fashion as a bicycle by positioning adjacent spokes of the wheel about upper member 704 such that the rim of the wheel rests on member 704. Dismounting bicycles or other wheeled vehicles from the carrier is accomplished via a last in, first out approach. Specifically, in the example of FIG. 7, the second bicycle 710 to be loaded onto the carrier is dismounted from the carrier before first bicycle 702.

Figure 8:
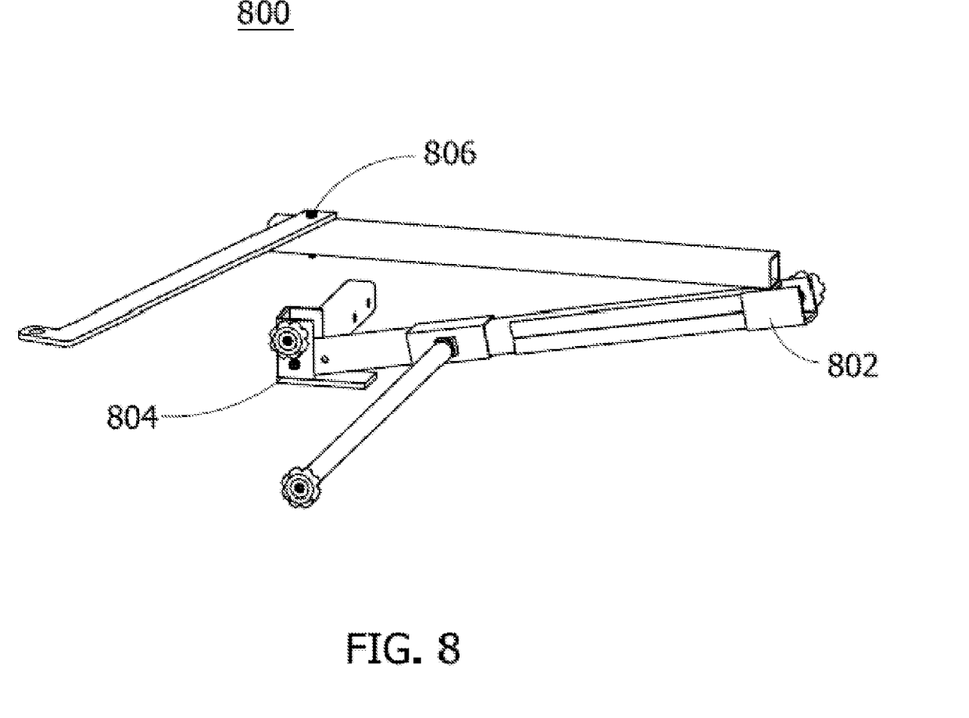
FIG. 8 is a schematic diagram of a collapsible bicycle carrier according to some embodiments of the present invention.

FIG. 8 is a schematic diagram of a collapsible bicycle carrier 800 according to some embodiments of the present invention. As shown, bicycle carrier 800 has generally the same or a similar form and function as bicycle carrier 100 (FIG. 1) and bicycle carrier 500 (FIG. 5) when carrier 800 is expanded, including with respect to the inclusion of a hitch member (e.g., same or similar to hitch member 102), vertical or generally vertical member (e.g., same or similar to member 104), horizontal or upward angled upper member (e.g., same or similar to member 106), and horizontal or upward angled lower member (e.g., same or similar to member 108). In addition, bicycle carrier 800 includes connection 802 (e.g., a hinged connection) that allows a top part of the vertical member to fold onto a bottom part of the vertical member in a collapsed state. In the expanded state, the top and bottom parts of the vertical member are held in general alignment by a pin in connection 802 and a corresponding hole in the top part of the vertical member. Bicycle carrier 800 also includes connection 804 (e.g., a swivel connection). In the collapsed state, connection 804 rotates (and thus causes the hitch member to rotate) in order to create a space for receipt of the top part of the vertical member. When the top part of the vertical member is received within connection 804, a pin in connection 804 and a corresponding hole in the top part of the vertical member secure the vertical member within connection 804. FIG. 8 also shows that, in some embodiments, the upper member can be attached to the vertical member via, for example, a bolt 806 and corresponding nut on an opposite side of the vertical member. In some embodiments, the upper member may be attached to the vertical member via a pivot joint that allows the upper member to fold back over the vertical member (e.g., for storage when the bicycle carrier is not in use). A corresponding locking mechanism may also be provided to keep the upper member in a deployed position when carrier 800 is use. In some embodiments, the collapsible nature of bicycle carrier 800 may allow it to safely remain attached to an automobile, without having to disassemble any part of it, even when carrier 800 is not in use.

Figure 9:
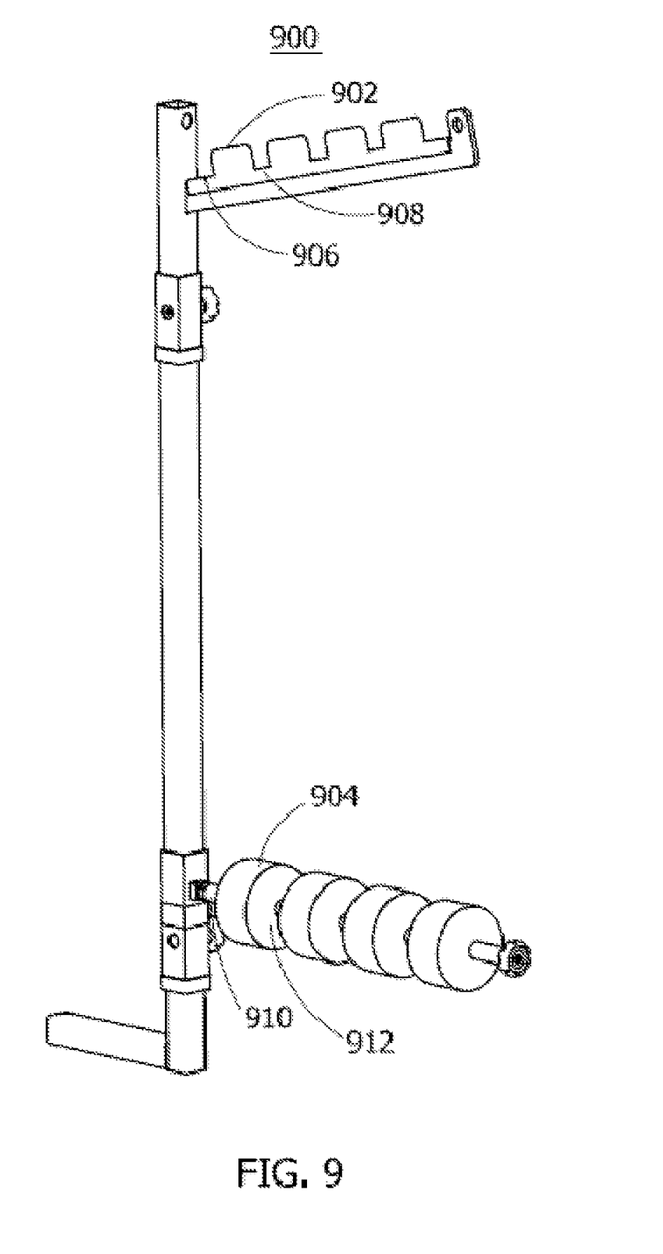
FIG. 9 is a schematic diagram of a bicycle carrier having spacers positioned along upper and lower members according to some embodiments of the present invention.

FIG. 9 is a schematic diagram of a bicycle carrier 900 having one or more spacers 902 positioned along the upper member (e.g., four spacers), and one or more spacers 904 along the lower member (e.g., four spacers), according to some embodiments of the present invention. In this embodiment, spacers 902 and 904 can prevent bicycles or other wheeled vehicles from coming into contact with each other or reduce such contact. In use, the rims of adjacent bicycles separated by spacer 902 rest on the upper member in recesses 906 and 908. The free-hanging, bottom wheels of the bicycles separated by spacer 904 abut the side of the lower member within recesses 910 and 912. As shown and described above in connection with FIG. 7, adjacent bicycles can be oppositely oriented such that the bottom wheel of the first bike abuts one side of the lower member and the bottom wheel of the second bike abuts the opposite side of the lower member. The spacers and corresponding recesses may be formed from or comprise any suitable material such as, for example, rubber, silicon, urethane, foam, or any other suitable material or combination of materials (e.g., silicon or rubber coated steel). In various embodiments, spacers 902 and 904 can be attached to, or formed integrally with, the upper and lower members. In some embodiments, other than the inclusion of spacers 902 and 904, bicycle carrier 900 may have generally the same or a similar form and function as bicycle carrier 100 (FIG. 1), bicycle carrier 500 (FIG. 5), and bicycle carrier 800 (FIG. 8).

Figure 10:
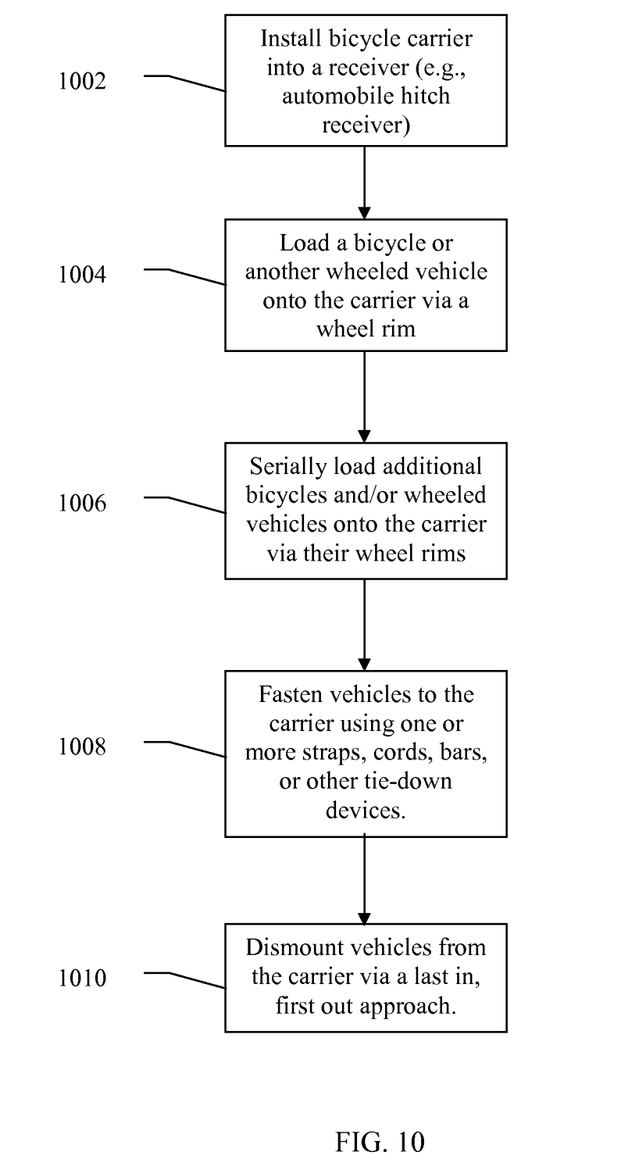
FIG. 10 is a flowchart of illustrative stages involved in installing a bicycle carrier, loading bicycles and/or other wheeled vehicles onto the carrier, and dismounting vehicles from the carrier according to some embodiments of the present invention.

FIG. 10 is a flowchart of illustrative stages involved in installing a bicycle carrier, loading bicycles and/or other wheeled vehicles onto the carrier, and dismounting vehicles from the carrier according to some embodiments of the present invention. Various implementations of a carrier according to embodiments of the present invention provide a quick and easy way to load and unload bicycles with various frame configurations, for example, so that common components of each bicycle will not interfere with the components of the adjacent bicycle. At stage 1002, the bicycle carrier is installed onto the rear of an automobile (e.g., into a standard hitch receiver) or into another receiver (e.g., attached to a wall in a garage) for storage. For example, the bicycle carrier may be attached to a hitch receiver by inserting a hitch member of the carrier into the hitch receiver and inserting a hitch pin into holes that line up in the hitch receiver and the hitch member.

At stages 1004-1008, bicycles and/or other wheeled vehicles are loaded onto the carrier. At stage 1004, one or more bicycles and/or other wheeled vehicles are loaded onto the carrier by sliding one of the wheel rims onto an upper member of the carrier (e.g., upper member 106, FIG. 1). This allows the upper member to slide between the spokes of the wheel (e.g., FIGS. 6 and 7). The first vehicle is slid all the way along the length of the upper member until it is adjacent to a vertical or generally vertical member (e.g., member 104, FIG. 1). In some embodiments, the vehicle hangs from the upper member in its natural position, about its center of gravity.

At stage 1006, another vehicle and any additional vehicles are then loaded serially onto the carrier in the same manner. In some embodiments, the directions that bicycles face when loaded could be intentionally alternated (e.g., having one lower bicycle wheel oriented towards the left of the lower member, the next lower bicycle wheel oriented towards the right of the lower member, and so on, as shown for example in FIG. 7). This may help to maximize the carrying capacity of the carrier, by letting the components of each bicycle overlap each other and providing for tight "nesting" of the bicycles to allow more bicycles to fit in the same space as standard carriers, thereby allowing a greater total quantity of bicycles to be carried. In some embodiments, handle bars and/or seats of adjacent vehicles are positioned on opposite sides of the lower member, which may allow for tighter nesting than if the handlebars and/or seats are kept on the same side of the lower member while positioning their wheels onto opposite sides. Use of a lower member (e.g., lower member 108, FIG. 1) may stabilize the lower part of the bicycles and prevent swaying during storage or transport.

At stage 1008, the vehicles(s) may be securely fastened to the bicycle carrier using one or more straps, chords, bars, and/or other tie down devices (e.g., which may extend from a distal end of the upper member to the vertical member).

At stage 1010, dismounting bicycles or other wheeled vehicles from the carrier is accomplished via a last in, first out approach. For example, as shown and described in connection with FIG. 7, second bicycle 710 to be loaded onto the carrier is dismounted from the carrier before bicycle 702.

Figure 11:
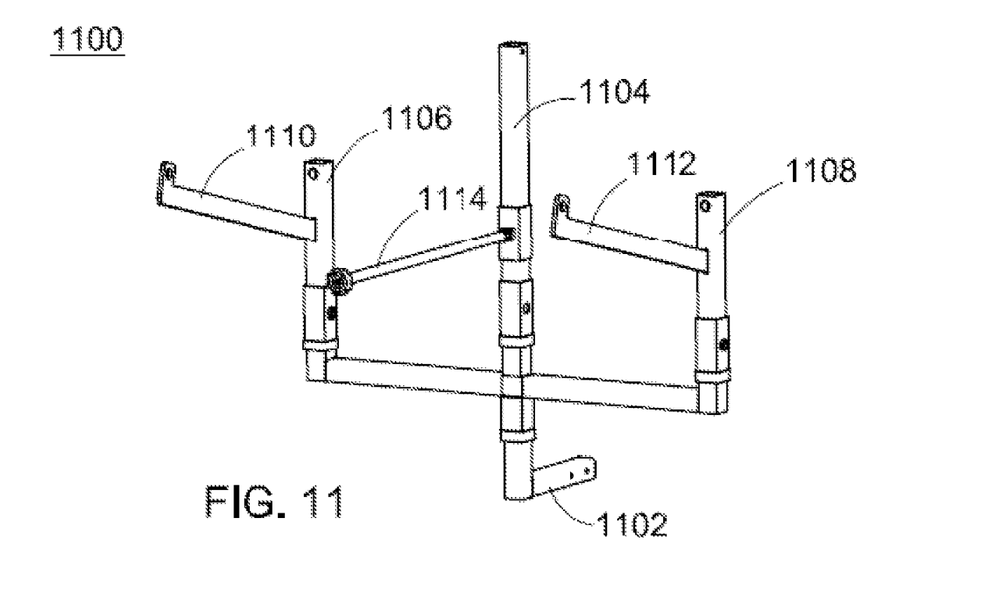
FIG. 11 is a schematic diagram of another bicycle carrier configured for loading of bicycles horizontally and right-side-up according to some embodiments of the present invention.
Figure 12:
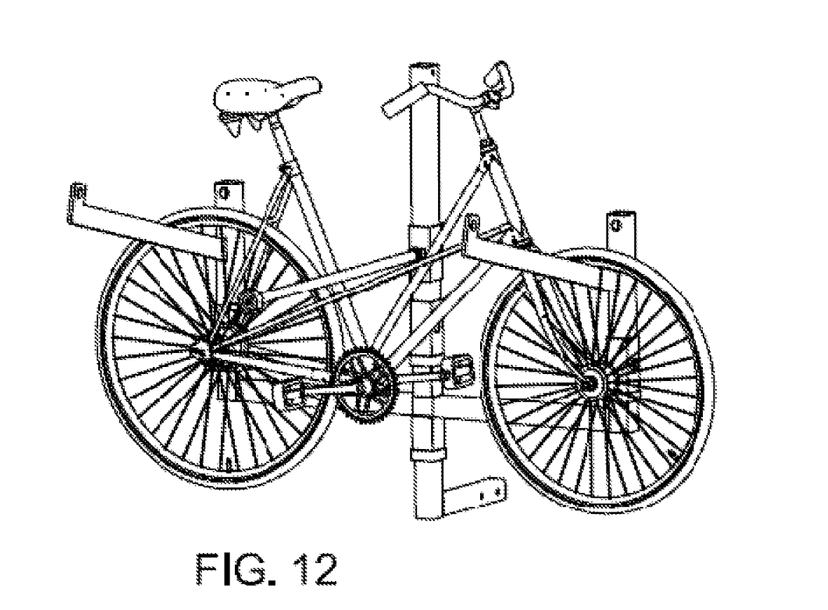
FIG. 12 is a perspective view of the bicycle carrier of FIG. 11 having a bicycle loaded thereon.

FIG. 11 is a schematic diagram of another bicycle carrier 1100 configured for loading of bicycles generally horizontally and right-side-up according to some embodiments of the present invention. Carrier 1100 includes hitch member 1102 (e.g., same or similar to hitch member 102, FIG. 1), first vertical or generally vertical member 1104, second vertical or generally vertical member 1106, third vertical or generally vertical member 1108, first and second members 1110 and 1112 (e.g., same or similar to upper member 106, FIG. 1), and member 1114 (e.g., same or similar to lower member 108, FIG. 1). Carrier 1100 may be manufactured or sold in one piece, or in multiple pieces, and using any suitable material or combination of materials as described above in connection with the embodiments shown in FIGS. 1-9. As shown in FIG. 12, in use adjacent spokes in the wheels of a bicycle may be positioned about members 1110 and 1112 of bicycle carrier 1000 to hold the bicycle in a horizontal, right-side-up position. Member 1114 may be adjustable, for example, to come into contact with the bicycle frame(s) to stabilize the bicycle(s) and prevent swaying during storage or transport.

Figure 13:
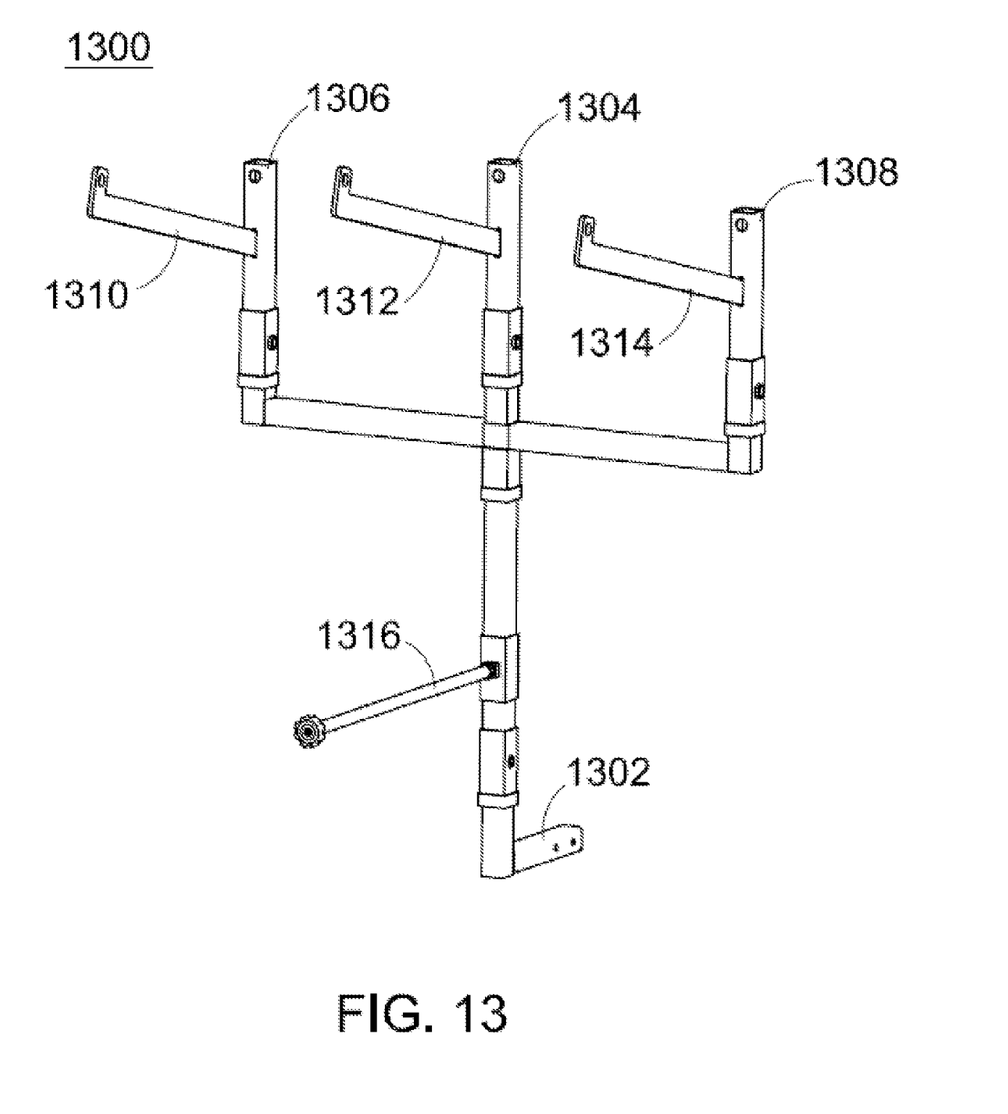
FIG. 13 is a schematic diagram of another bicycle carrier configured for vertical and horizontal loading of bicycles and/or other wheeled vehicles according to some embodiments of the present invention.
Figure 14:
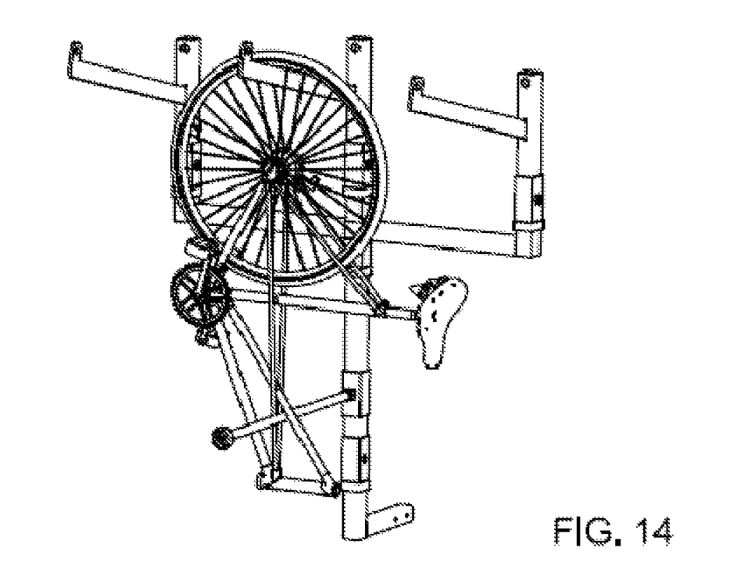
FIG. 14 is a perspective view of the bicycle carrier of FIG. 13 having a vehicle loaded vertically thereon.
Figure 15:
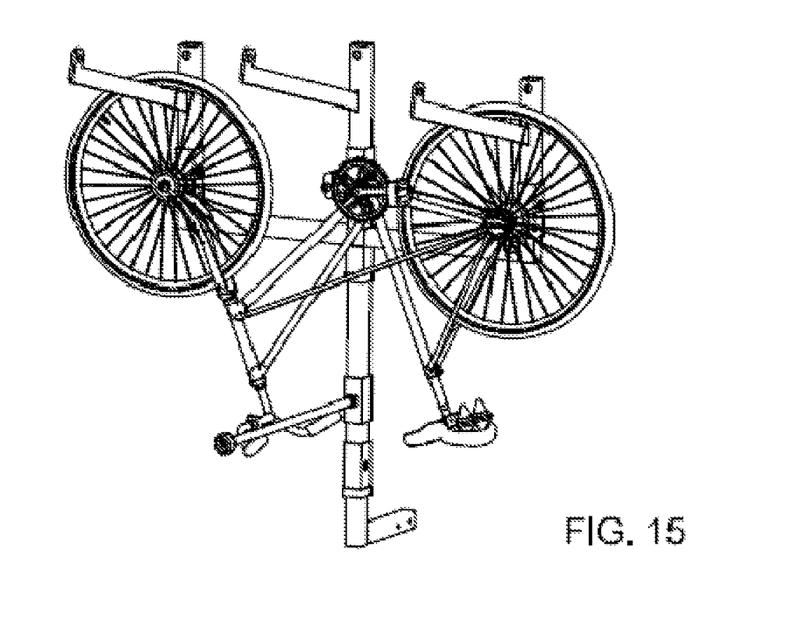
FIG. 15 is a perspective view of the bicycle carrier of FIG. 13 having a bicycle loaded horizontally and up-side-down thereon.

FIG. 13 is a schematic diagram of another bicycle carrier 1300 configured for both vertical and horizontal loading of bicycles according to some embodiments of the present invention. Carrier 1300 includes hitch member 1302 (e.g., same or similar to hitch member 102, FIG. 1), first vertical or generally vertical member 1304, second vertical or generally vertical member 1306, third vertical or generally vertical member 1308, first, second, and third members 1310, 1312, and 1314 (e.g., same or similar to upper member 106, FIG. 1), and member 1316 (e.g., same or similar to lower member 108, FIG. 1). Carrier 1300 may be manufactured or sold in one piece, or in multiple pieces, and using any suitable material or combination of materials as described above in connection with the embodiments shown in FIGS. 1-9. As shown in FIG. 14, in use adjacent spokes in the wheel of a bicycle or other wheeled vehicle may be positioned about member 1312 of bicycle carrier 1300 to cause the vehicle to hang vertically. Member 1316 may be adjustable and serve the same or a similar function as described in connection with lower member 108 in FIG. 1. As shown in FIG. 15, one or more bicycle(s) can also be loaded in a horizontal, up-side-down position by positioning adjacent spokes in the wheels about members 1310 and 1314 of carrier 1300.

ADDITIONAL EMBODIMENTS

Thus it is seen that carriers are provided for storage and transport of bicycles and/or other wheeled vehicles. Although particular embodiments have been disclosed herein in detail, this has been done by way of example for purposes of illustration only, and is not intended to be limiting with respect to the scope of the appended claims, which follow. In particular, it is contemplated by the applicant that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. Applicant reserves the right to pursue such inventions in later claims.

What is claimed is:

1. A bicycle carrier comprising: a support member;
a hitch member extending from said support member;
an elongate upper member extending from said support member, said elongate upper member having an elongate body and a free distal end configured for receipt, serially one after another, of a plurality of wheels of a corresponding plurality of bicycles by positioning adjacent wheel spokes of a first wheel of each bicycle about said free distal end and moving each bicycle backward along said elongate body towards said support member, said elongate body being configured to support a weight of said bicycles via contact with rims of said plurality of bicycle wheels and cause a remainder of said bicycles to hang below said elongate body; and
an elongate lower member extending from said support member and positioned generally below said elongate upper member by an adjustable connection which allows a distance between the elongate upper member and the elongate lower member to be adjusted, said elongate lower member being configured to contact and stabilize said bicycles hanging from said elongate body of said upper member, wherein said elongate upper member extends from said support member at an upward angle of about 5 degrees to about 30 degrees, and wherein the free distal end of the elongate upper member has a height greater than the remainder of the elongate upper member such that the free distal end acts as a stop to prevent said bicycles from shifting off the end of the elongate upper member during travel.

2. The bicycle carrier of claim 1, wherein said elongate upper member has a thickness that is less than its length and height along an entire span of said elongate upper member and said free distal end, said length being a distance that said elongate upper member extends from said support member, said height being a distance spanned by said elongate upper member in a direction generally parallel to said support member, and said thickness being a distance spanned by said elongate upper member in a direction generally perpendicular to said support member.

3. The bicycle carrier of claim 2, wherein said elongate upper member has a thickness of less than or equal to about ½ inch along said entire span of said elongate upper member and said free distal end, and a height of less than or equal to about 4 inches along said entire span of said elongate upper member and said free distal end.

4. The bicycle carrier of claim 1, wherein said elongate lower member extends generally perpendicularly from said support member.

5. The bicycle carrier of claim 1, wherein said hitch member extends from said support member in a first direction and said elongate upper member and said elongate lower member extend from said support member in a second direction opposite to said first direction.

6. The bicycle carrier of claim 1, wherein said elongate lower member extends from said support member directly below and with no lateral offset relative to said elongate upper member.

7. The bicycle carrier of claim 1, wherein said elongate lower member is attachable to, and detachable from, said support member and said support member is configured with a plurality of locations at which said elongate lower member can be attached to said support member.

8. The bicycle carrier of claim 1, wherein said body of said elongate upper member comprises at least one spacer configured to separate the rim of a first bicycle of said plurality of bicycles from the rim of a second bicycle of said plurality of bicycles.

9. The bicycle carrier of claim 1, wherein said elongate lower member comprises at least one spacer configured to separate a first bicycle of said plurality of bicycles hanging from said elongate upper member from a second bicycle of said plurality of bicycles hanging from said elongate upper member.

10. The bicycle carrier of claim 1, wherein at least one of said body of said elongate upper member and said elongate lower member comprises a soft durometer surface material positioned to prevent damage to said bicycles.

11. The bicycle carrier of claim 10, wherein said soft durometer material is selected from the group or materials consisting of rubber, silicon, urethane, and foam.

12. The bicycle carrier of claim 1, wherein said support member includes a hinged connection along its length to allow said support member to be collapsed when not in use.

13. The bicycle carrier of claim 1, wherein said upper support member comprises a plurality of locations for receipt of said elongated lower member.

14. The bicycle carrier of claim 13, wherein said plurality of locations are located from approximately 12 inches above said hitch member to approximately 36 inches above said hitch member.

15. The bicycle carrier of claim 1, wherein said elongated lower member is slidably engaged with said support member.

16. The bicycle carrier of claim 1, wherein said support member comprises approximately 2×2 tubing.

17. The bicycle carrier of claim 1, wherein said support member is approximately 70 inches long.

* * * * *